Nov. 10, 1936.   B. N. PARMENTER   2,060,109
WINDOW DEVICE
Filed Nov. 15, 1934   5 Sheets-Sheet 2

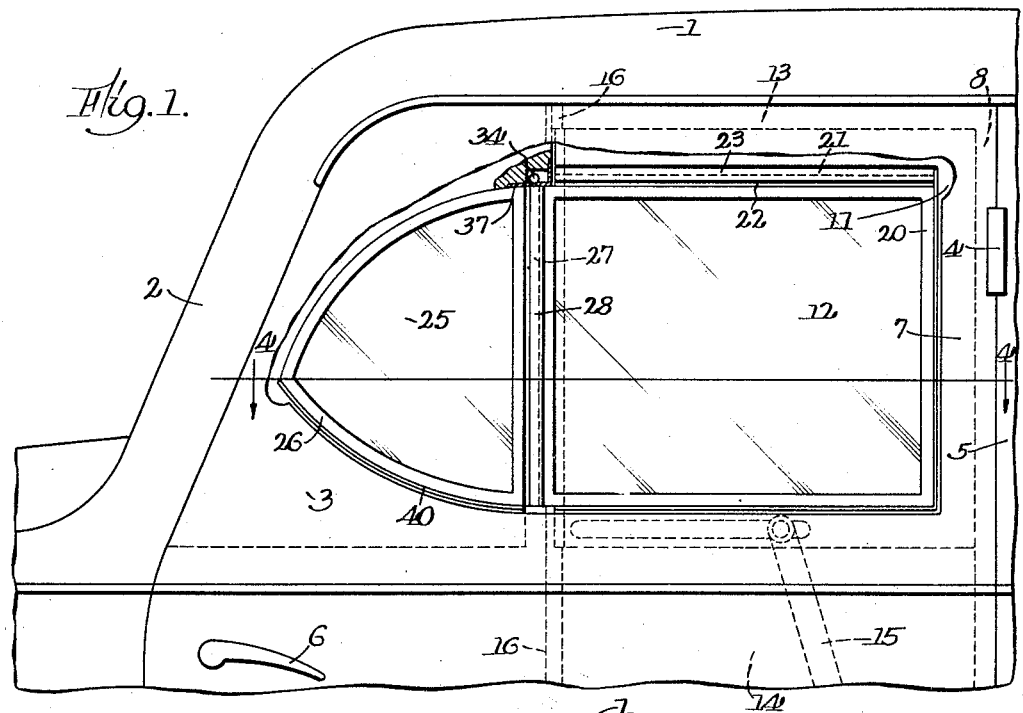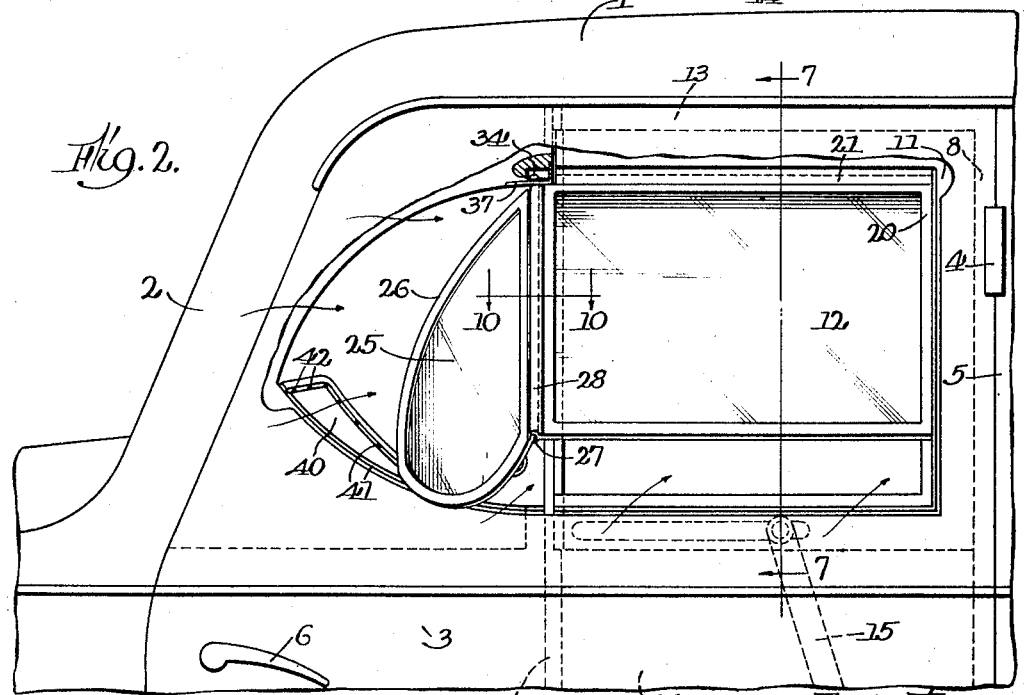

Inventor:
Bert N. Parmenter
BY: Parkinson & Lane, Atty.

Nov. 10, 1936.  B. N. PARMENTER  2,060,109
WINDOW DEVICE
Filed Nov. 15, 1934  5 Sheets-Sheet 3
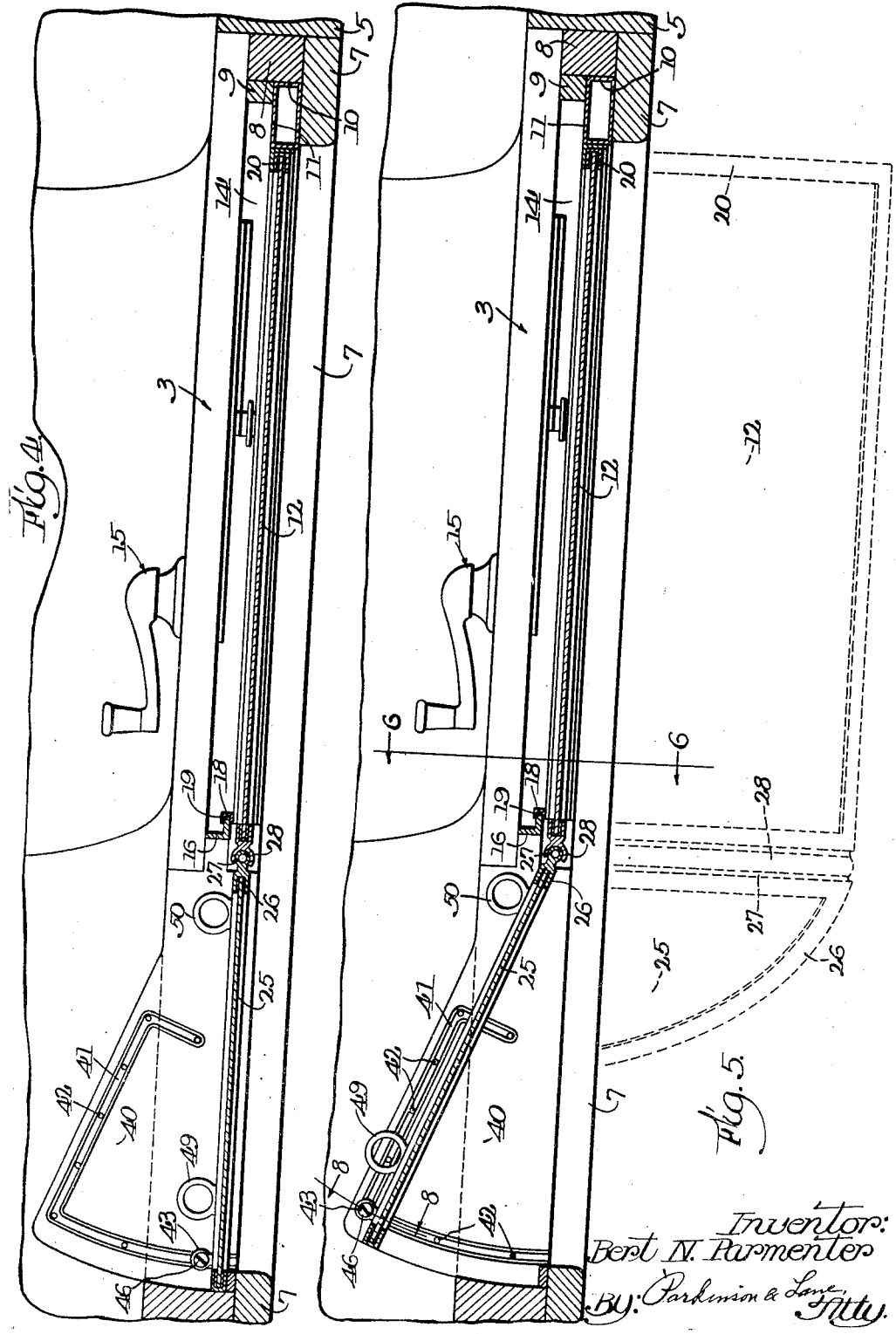

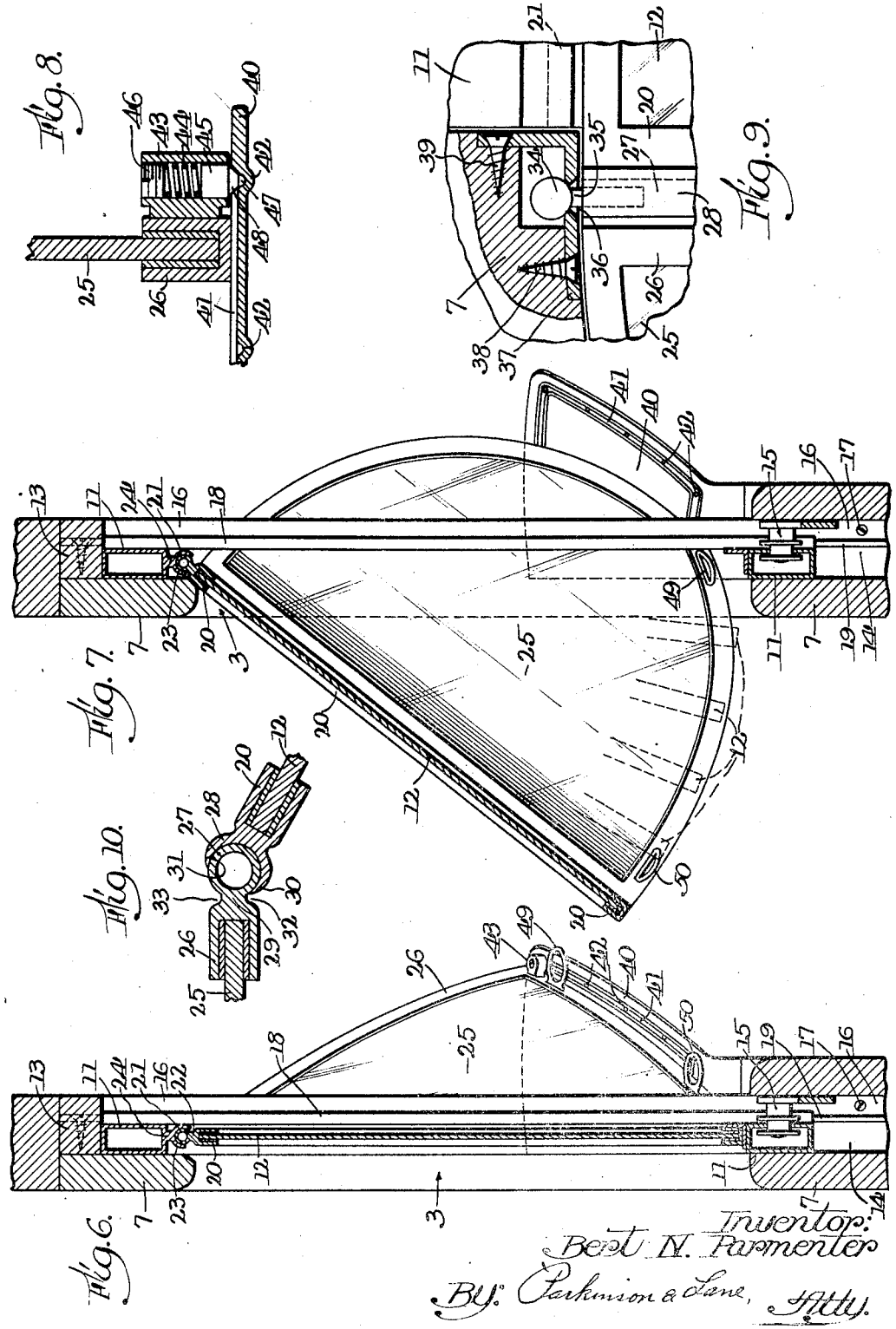

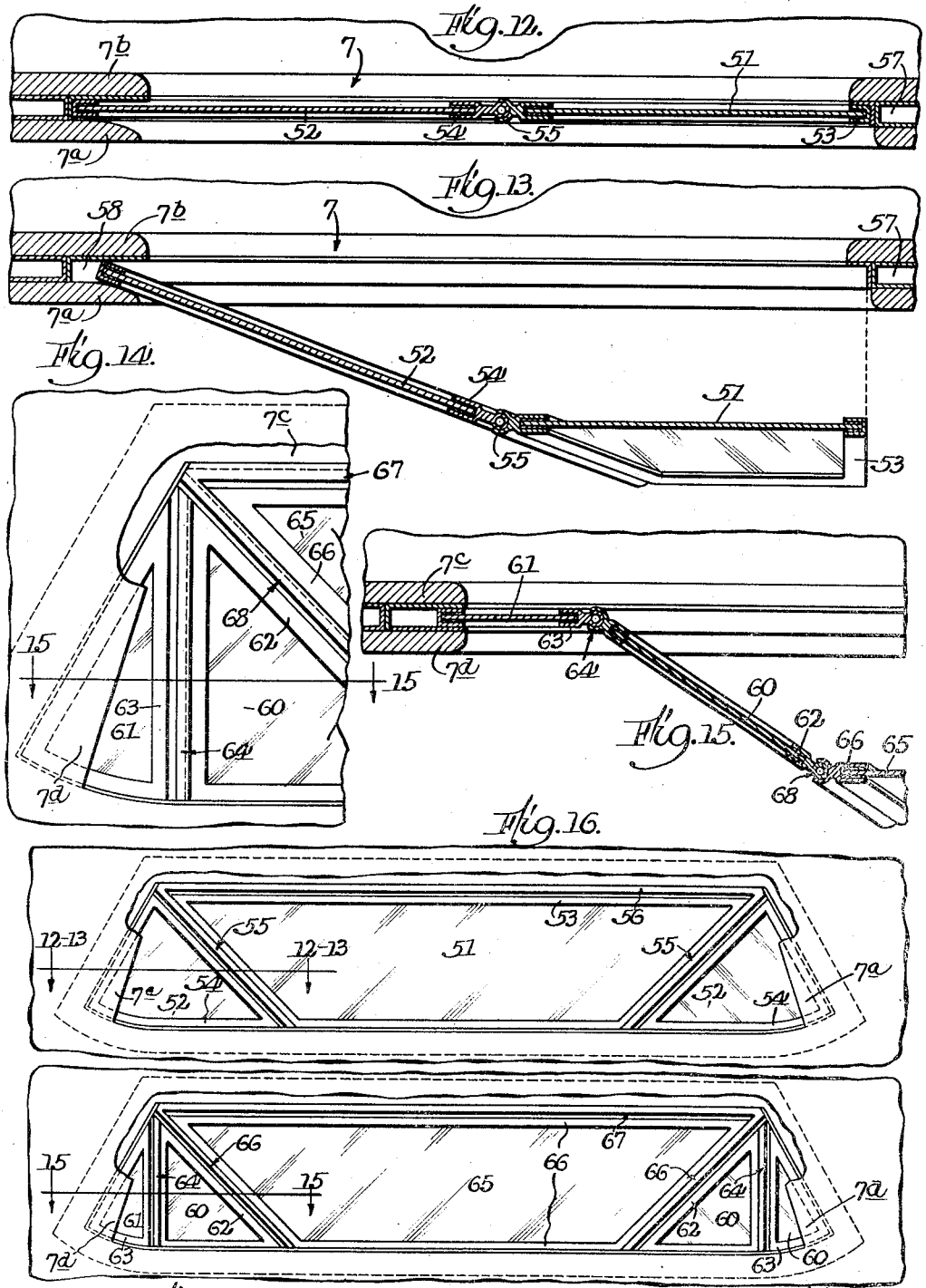

Patented Nov. 10, 1936

2,060,109

UNITED STATES PATENT OFFICE 2,060,109

WINDOW DEVICE

Bert N. Parmenter, Lake Forest, Ill.

Application November 15, 1934, Serial No. 753,087

14 Claims. (Cl. 296—44)

The present invention relates to window devices, such as those used in vehicles, although the invention is not limited to windows in vehicles but is equally applicable to windows in stationary structures, such as buildings, the invention being herein disclosed in connection with an automobile for the purpose of illustration.

Among the objects of the invention is to provide a novel window device comprising a plurality of panes which are so connected together or so articulated that a pane may be moved relative to another either angularly or linearly as desired.

Another object of the invention is to provide a novel articulation whereby a pane may slide relative to another while at the same time the articulation permits relative angular movement of the panes.

Other objects, capabilities, advantages, features and the like are comprehended by the invention as will later appear, and as are inherently comprehended by the invention.

Referring to the drawings:

Fig. 1 is a side view of a part of a vehicle showing the application of the invention, the window being in closed position;

Fig. 2 is a similar view showing the window in open position;

Fig. 4 is a horizontal sectional view taken in a plane represented by line 4—4 in Fig. 1 of the drawings;

Fig. 5 is a similar view showing a pane in open position;

Fig. 6 is a vertical sectional view taken in a plane represented by line 6—6 in Fig. 5 of the drawings;

Fig. 7 is a similar view taken in a plane represented by line 7—7 in Fig. 2 of the drawings;

Fig. 8 is a fragmentary sectional view on an enlarged scale of detent means for selectively setting the position of the window;

Fig. 9 is a similar view of the support for the articulation or hinge between the panes;

Fig. 10 is a similar view taken in a pane represented by line 10—10 in Fig. 2 of the drawings;

Figure 11:
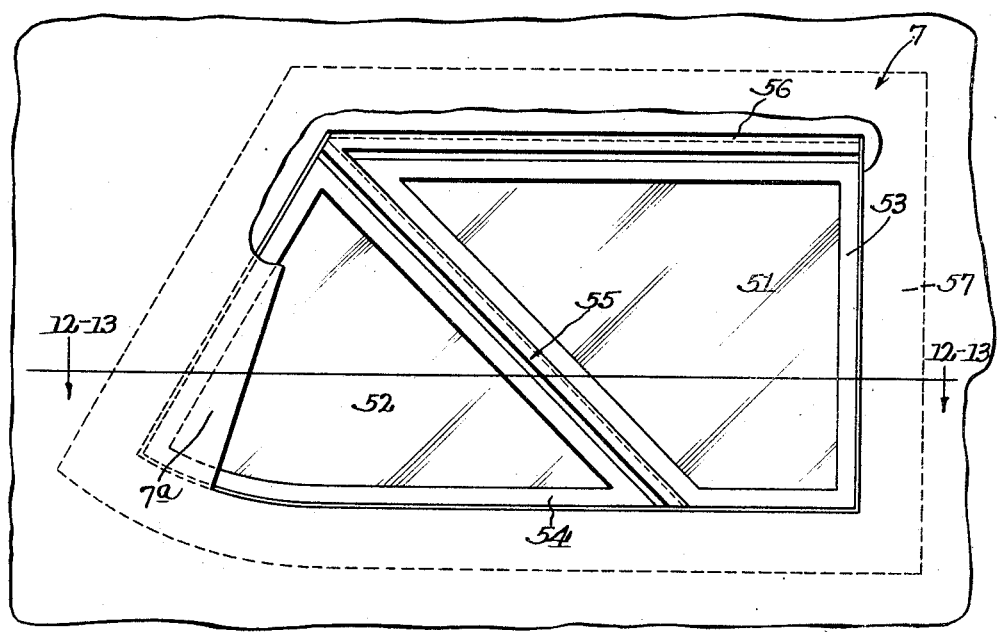
Fig. 11 is a side view of part of a vehicle and showing an alternate form of window wherein the axis of the articulation or hinge between the panes is on an incline.

Figs. 12 and 13 are horizontal sectional views taken in planes represented by line 12—13——12—13 in Figs. 11 and 16 of the drawings, for showing closed and open positions of the alternate form of window shown in Fig. 11;

Fig. 14 is a fragmentary elevational view of another alternate form of window;

Fig. 15 is a horizontal sectional view taken in a plane represented by line 15—15 in Figs. 14 and 17 of the drawings;

Fig. 16 is a view in elevation of a window similar to that shown in Fig. 11 but having auxiliary panes at both ends; and, Fig. 17 is a similar view of a window similar to that shown in Figs. 14 and 15 but having auxiliary panes at both ends.

Figure 3:
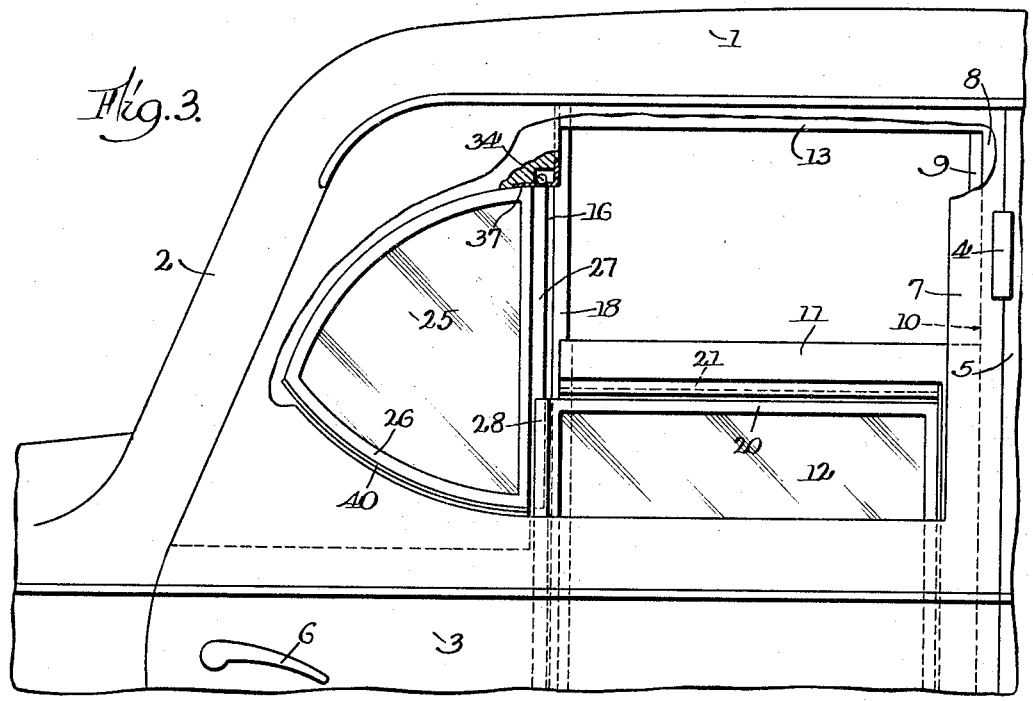
Fig. 3 is a similar view showing a pane slid down in open position.

Referring more in detail to the drawings the embodiments selected to illustrate the invention are shown in connection with a vehicle having a top 1, a front 2, and a door 3 mounted by hinges 4 secured to the body 5. The door has a handle or latch 6, (Figs. 1, 2 and 3). The window opening in the door is surrounded by a frame 7 which is a part of the door side 3, and this frame comprises a stile 8 (Figs. 4 and 5) which with a guide piece 9 forms a vertical channel 10 for the sliding of the frame 11 for the main pane 12. At the top there is a lintel 13 (Figs. 6 and 7) which acts as a stop for the upper part of the frame 11 when in raised position. The lower part of the door has a space 14 in which the frame 11 is adapted to slide by suitable operating means 15 (Figs. 6 and 7) operable from the inside of the door. The frame 11 is preferably made from hollow metal tubing for the advantage of lightness in weight and rigidity of structure.

Forward of the frame 11 is a vertical guide post 16 (Figs. 4 and 5) of angle cross-sectional shape and secured at its upper end to the lintel 13 and at its lower end to the door 3 in the door space 14 as by screws 17 (Figs. 6 and 7), the post extending to the bottom of the door space 14. To the forward part of the frame 11 is fixed a channel member 18 which is slidably fitted over the flange 19 (Figs. 4, 5, 6 and 7) of the guide post 16. When the frame is lowered and raised the member 18 slides on the flange 19, the rear side of the frame 11 being guided in the channel 10 in the door (Figs. 4 and 5).

The pane 12 comprises a frame 20 which is preferably of metal channel pieces in the channels of which are set the edges of the glass. The upper part of the frame 20 is hinged or articulated to the upper part of the frame 11 (Figs. 6 and 7) so that the pane 12 may swing about the axis of the articulation. The articulation comprises a pintle 21 which may be in the form of a cylinder or tube as shown. This pintle is secured along a side thereof to a web 22 which is secured to the upper part of the frame 20 of the pane. The pintle 21 fits into a socket 23 of hollow cylindrical form and having a slot or opening along a side thereof for the extending therethrough of the web 22 of the pintle. The angular magnitude of the socket is greater than 180° so as to prevent the pintle moving out of the socket. The ends of the socket are open so that the pintle may be slid into place when assembling the device. The socket is secured to the upper part of the frame 11 either directly or by a web 24. The width of the slot is sufficient to permit a substantial angular movement of the pintle 21 and the web 22. The web 22 is made thinner than the channel part of the frame 20 of the pane for the purpose of providing for a greater angular play or movement of the pintle and web. If desired the edge portions of the socket at the slot may be beveled (Fig. 10) so that a greater angular movement may be afforded by the beveled edges being able to enter the spaces or grooves between the frame 20 and the pintle 21 and at each side of the web 22. This type of articulation prevents the entry of rain or spray or the like.

Forwardly of the pane 12 is an auxiliary pane 25 having its edges set in the channels of a frame 26 made from metal channel pieces (Figs. 4 and 5). This pane closes (when in closed position) the forward part of the window opening in the door. The forward part of the frame 7 overlaps the forward part of the frame 26 of the pane 25 so as to guard against the entry of rain, water, spray and the like.

The rear portion of the frame 26 is hinged or articulated to the forward portion of the frame 20, by an articulation comprising a pintle 27 (Fig. 10) which may be in the form of a cylinder or tube, and a socket 28 in the form of a hollow cylinder. The socket is secured along a side thereof to the forward edge portion of the frame 20 and the pintle is secured along a side thereof to the rear edge portion of the frame 26 preferably by way of a web 29. The socket is provided along a side thereof with a slot or opening through which the web 29 extends. The pintle 27 is mounted within the socket 28 and has an angular movement to the extent of the angular play the web 29 has in the slot, the latter being sufficiently wide to afford a substantial amount of angular movement of the pintle 27 and web 29 relative to the socket 28 and the frame 20. The socket 28 is also open at its ends so that the pintle 27 and the socket 28 may have relative sliding or axial movement when assembling the parts and when the pane 12 and its frame 20 are lowered and raised. It will be noted that the angular magnitude of the socket 28 is greater than 180° so that the pintle will not move out of the socket through the slot or opening provided in the side of the socket and through which the web 29 extends. For the purpose of affording a wide angle of swing the edge portions 30 and 31 of the socket are preferably beveled as shown so that they may enter into the grooves 32 and 33 formed between the shoulders of the frame 26 and the pintle 27 at each side of the web 29, thus giving greater angular play than would be possible if the edge portions 30 and 31 were square.

The upper end of the pintle 27 is universally articulated to the upper part of the frame 7 (Fig. 9) by way of a ball and socket joint comprising a ball 34 having a stem 35 secured to the upper end portion of the pintle 27 and passing through an opening 36 provided in the bottom wall 37 of the socket member which is secured to the frame 7 by suitable means, as by screws 38 and 39. The ball 34 has a swinging movement about the axis of the hinge 21—23 when the pane 12 is swung to and from open position, and has a turning movement about the axis of the hinge 27—28 when the pane 12 is angularly moved.

Beneath the forward portion of the pane 25 is located a sector shaped ledge 40 suitably secured to the inside of the door frame 7 and fitting closely thereto and also closely to the lower frame part of the frame 26. This ledge is inclined rearwardly and also laterally toward the door so as to drain off any water that might fall on the ledge. The ledge is provided with a guide channel or groove 41 (Figs. 2, 4, 5, 6, 7 and 8) provided at intervals with detent depressions 42 for the guiding and the selective positioning of the panes 25 and 12 when opening or closing them. To the lower frame part of the frame 26 (Figs. 6, 7 and 8) is secured a detent device comprising a socket 43 in which is a spring 44 reacting between a detent 45 and a pressure adjusting screw 46. The lower end of the detent 45 is provided with a rounded nib 47 adapted to seat in the depressions 42 for holding the panes in selected position. The detent is also provided with a tapered part 48 adapted to fit into the guiding groove on channel 41 as the pane and detent device are moved. To the lower part of the frame 26 may also be secured suitable finger rings 49 and 50, the ring 49 being utilized to swing and move the pane 25 with its detent device along the guiding groove 41, and the ring 50 is useful in pulling in the panes into closed position when closing the window device.

In Fig. 5 is shown a plan view in dotted lines of the position of the panes when in open position.

In use, and assuming the window device is closed, the driver may merely open the pane 25 by pulling laterally on the ring 49 and the pane 25 may be moved from the position shown in Fig. 4 to that shown in Fig. 5 or to any intermediate position thereof. The pane, in that case, simply turns on the axis of the hinge 27—28. If it be desired to open pane 12, then the driver pulls rearwardly on the ring 49 so as to cause the detent to move down the guiding groove 41 to any desired position or to the end thereof. This causes the pane 12 to move outwardly about the axis of the hinge 21—23 and at the same time causes the pane 25 to swing about the axis of the hinge 27—28. The full open position of both panes is shown in Figs. 2 and 7 and by the dotted lines in Fig. 5. To close the window a reverse operation is effected. If the pane 12 does not close completely, a pull on the ring 50 will effect complete closing.

If it be desired only to open the pane 12, the driver operates the window mechanism 15 to cause the pane 12 to slide down in the door space 14. In this case the frame 11 to which the pane 12 is hinged at the top, slides down in the guiding channel 10 (Figs. 4 and 5) and along the guiding post 16, the channel piece 18 sliding on the flange 19. At the same time the hinge socket 28 slides down on the hinge pintle 27 which is held suspended by the ball and socket joint at the top of the frame 7. The socket 28 is of sufficient length as not to leave the pintle 27. For closing the pane 12, the reverse operation is effected.

When in open position, as shown as for example in Figs. 2 and 7, the pane 25 deflects the air into the front part of the tonneau and the air in the tonneau passes out beneath the open pane 12. Rain, however, will be deflected outwardly by the pane 25, while the pane 12 prevents the entry of rain at that part of the door.

The structure above described is applicable to any of the doors of the vehicle whether it be an automobile, a railway car, a boat, etc., or to any stationary structure, as a building and the like, and also to windows not provided in doors, such as the rear side windows, the rear window, and even the windshield of any vehicle, or to any window of a stationary structure, as a building or the like.

The device shown in Figs. 11, 12 and 13, for the purpose of illustration, is designed for such windows as a rear side window of an automobile. It comprises panes 51 and 52 set in frames 53 and 54 hinged together by an inclined hinge 55 of the same type described above in connection with Figs. 1 to 7 inclusive and Fig. 10. The frame 53 is hinged at the top by a similar hinge 56 supported in the upper part of the body frame 7. The frame 7 (Figs. 12 and 13) has outer and inner frame parts 7$^a$ and 7$^b$ with an interposed frame 57 which may be of hollow metal pieces. At the forward end there is a recess 58 in which the forward end of the pane and frame 52—54 is nested when the window is in closed position. The frame part 7$^a$ overlaps this forward portion of the pane and frame 52—54 for the purpose of acting as a rain guard or water shed, the overlapping part mentioned being sufficiently wide (see Figs. 11 and 13) to cover the forward portion of the pane even when in open position as shown in Fig. 13.

In use it is simply necessary to push outwardly on the pane 51 to cause it to swing about the axis of the hinge 56, and the pane 52 automatically moves from its closed and nested position (Fig. 12) to the position shown in Fig. 13, the pane 52 sliding rearwardly and also moving angularly about the axis of the hinge 55.

In the form of device shown in Figs. 14 and 15, there are two auxiliary panes 60 and 61 set in frames 62 and 63 which are articulated by a hinge device 64 of the type described above. The main pane 65 is set in frame 66 which is articulated to the body frame 7$^c$ by a hinge device 67 for swinging of the main pane about the axis of the hinge device 67. The frames 62 and 66 are further articulated by a hinge device 68. The outer frame part 7$^d$ is of such width as to cover or overlap the pane 61 even when in open position. Between the frame parts 7$^c$ and 7$^d$ is a recess in which the end portion of the pane and frame 61—63 is nested when the window is in closed position. In use it is simply necessary to push outwardly on the pane 65 to swing it about the axis of hinge 67. This automatically causes a sliding of the pane 61 from its nested position to the position shown in Fig. 15, and also causes the pane 60 to turn on the axes of the hinges 64 and 68 and attain the position shown in Fig. 15. Such a window sheds rain and yet permits the free passage of air.

Figs. 16 and 17 show windows of the type disclosed in connection with Figs. 11, 12, 13, 14 and 15 but showing the use of auxiliary panes at both ends of the main pane, the same reference characters being used to show corresponding parts. These windows while applicable to windows in any location, such as at the sides of a vehicle, are particularly applicable to windows at the front and rear of a vehicle, such as the rear window of an automobile and the windshield thereof.

Another advantage possessed by this type of window is that when the window is partly or fully open, the panes being on an incline, reflections, as of street lights, headlights of following vehicles, sun rays from a low sun, and the like, are thrown down or to one side so that they are not visible to the driver and the other occupants of the vehicle, thus eliminating the difficulty of clearly seeing the way.

Suitable finger rings, guides, and latches similar to those disclosed above, may be secured to the frames as desired for the operation and the holding of the window as desired.

While I have herein disclosed a few illustrative embodiments of my invention, it is to be understood that the invention is not limited thereto but comprehends other constructions, details, arrangements of parts, features and the like without departing from the spirit of the invention.

Having thus disclosed the invention, I claim:

1. A window device comprising a window frame, a pane, a sash frame for said pane and being slidably mounted in said window frame, means for articulating said pane to said sash frame and being so constructed and arranged as to provide for angular movement of said pane relative to said sash frame, an auxiliary pane, means for articulating said auxiliary pane to said first mentioned pane and being so constructed and arranged as to provide for a relative angular movement of said panes and for a relative sliding movement of said panes when said sash frame is slidably moved in said window frame.

2. A window device comprising panes, means for articulating the panes, said means comprising a pintle and socket respectively secured to the adjacent edge portions of the panes, said pintle and socket being so constructed and arranged as to provide for relative angular movement of the pintle and socket about the axis of the pintle and socket and for relative axial movement of the socket and pintle, said socket being of greater length than said pintle.

3. A window device comprising panes, means for articuating the panes, said means comprising a cylindrical member secured along a side thereof to an edge portion of one of the panes for the full length of said edge portion of said pane, a hollow cylindrical socket secured along a side thereof to an edge portion of another of said panes for the full length of said pane, said socket having an open end and being provided with an opening along a side thereof whereby said cylindrical member is slidable in said hollow cylindrical socket and said cylindrical member is angularly movable in said hollow cylindrical socket.

4. A window device comprising a main frame having a window opening and a chamber, an auxiliary frame, means for slidably supporting said auxiliary frame in said main frame for sliding movement of said auxiliary frame to and from said window opening and from and to said chamber in said main frame, a main pane, means for hingedly connecting said main pane to said auxiliary frame for angular movement of said main pane relative to said auxiliary frame about the axis of said hinging means, an auxiliary pane, means for hingedly connecting said auxiliary pane to said main pane for angular movement of said auxiliary pane relative to said main pane about an axis disposed transversely to the axis of the hinging means connected to said main pane and said auxiliary frame.

5. A window device comprising a main frame having a window opening and a chamber, an auxiliary frame, means for slidably supporting said auxiliary frame in said main frame for sliding movement of said auxiliary frame to and from said window opening and from and to said chamber in said main frame, a main pane, means for hingedly connecting said main pane to said auxiliary frame for angular movement of said main pane relative to said auxiliary frame about a horizontal axis, an auxiliary pane, means for hingedly connecting said auxiliary pane to said main pane for angular movement of said auxiliary pane relative to said main pane about an axis disposed transversely to said horizontal axis.

6. A window device comprising a main frame having a window opening and a chamber, an auxiliary frame, means for slidably supporting said auxiliary frame in said main frame for sliding movement of said auxiliary frame to and from said window opening and from and to said chamber in said main frame, a main pane, means for hingedly connecting the upper part of said main pane to the upper part of said auxiliary frame for angular movement of said main pane relative to said auxiliary frame about a horizontal axis, an auxiliary pane, means for hingedly connecting said auxiliary pane to said main pane for angular movement of said auxiliary pane relative to said main pane about an axis disposed transversely to said horizontal axis.

7. A window device comprising a frame, a plurality of panes, means for slidably mounting one of said panes in said frame, means for connecting said panes and being so constructed and arranged as to provide for a relative angular movement of said panes and a relative sliding movement of said panes, said slidably mounting means having means so constructed and arranged as to support said slidable pane for angular movement about an axis transverse to the axis of said connecting means for said panes.

8. A window device comprising a frame, a main pane, means for hinging the main pane to the frame about an axis in the plane of the main pane in all angular positions of the main pane, an auxiliary pane, means for hinging the auxiliary pane to the main pane about an axis transverse to the axis of the main pane and frame and in the plane of the main pane in all angular positions of said main pane, said main and auxiliary panes being in a common plane when in closed position in said frame, and being in different planes at an angle to each other and to the common plane when in open position.

9. A window device comprising a frame, a main pane, means for hinging the main pane to the frame about a horizontal axis in the plane of the main pane in all angular positions of the main pane, an auxiliary pane, means for hinging the auxiliary pane to the main pane about an axis transverse to said horizontal axis and in the plane of the main pane in all angular positions of said main pane, said main and auxiliary panes being in a common plane when in closed position in said frame, and being in different planes at an angle to each other and to the common plane when in open position.

10. A window device comprising a frame, main and auxiliary panes, means for hingedly connecting said main pane to said frame and to said auxiliary pane on transverse axes disposed in the plane of said main pane in all relative positions of said panes and frame, said main and auxiliary panes being in a common plane when in closed position in said frame, and being in different planes at an angle to each other and to the common plane when in open position.

11. A window device comprising main and auxiliary frames and main and auxiliary panes, means for slidably supporting said auxiliary frame in said main frame, means for hingedly connecting said main pane to said auxiliary frame, means for hingedly connecting said auxiliary pane to said main pane, the axes of said hingedly connecting means being disposed in the plane of said main pane in all positions of said main pane, said main and auxiliary panes being in a common plane when in closed position in said frame, and being in different planes at an angle to each other and to the common plane when in open position.

12. A window device comprising main and auxiliary frames and main and auxiliary panes, means for slidably supporting said auxiliary frame in said main frame, means for hingedly connecting said main pane to said auxiliary frame, means for hingedly connecting said auxiliary pane to said main pane, the axes of said hingedly connecting means being disposed transversely to each other and in the plane of the main pane in all positions of said main pane, said main and auxiliary panes being in a common plane when in closed position in said frame, and being in different planes at an angle to each other and to the common plane when in open position.

13. A window device comprising a frame, a main pane, an auxiliary pane, means for hinging the main pane to the upper part of the frame, means for hinging the auxiliary pane to the main pane on an axis transverse to the axis of the hinging means for the main pane and the frame, and means so constructed and arranged as to provide for a combined sliding and angular movement of the lower part of the auxiliary pane relative to the lower part of the frame and for maintaining said lower parts in juxtaposition in all positions of said main pane.

14. A window device comprising a frame, a main pane, an auxiliary pane, means for hinging the main pane to the upper part of the frame, means for hinging the auxiliary pane to the main pane on an axis transverse to the axis of the hinging means for the main pane and the frame, said axes being disposed in the plane of said main pane in all positions of said main pane, and means so constructed and arranged as to provide for a combined sliding and angular movement of the lower part of the auxiliary pane relative to the lower part of the frame and for maintaining said lower parts in juxtaposition in all positions of said main pane.

BERT N. PARMENTER.